United States Patent
Yano et al.

(10) Patent No.: US 6,667,835 B2
(45) Date of Patent: Dec. 23, 2003

(54) OPTICAL FILM, POLARIZER AND DISPLAY DEVICE

(75) Inventors: Shuuji Yano, Ibaraki (JP); Seiji Umemoto, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 55 days.

(21) Appl. No.: 10/115,898

(22) Filed: Apr. 5, 2002

(65) Prior Publication Data

US 2002/0145804 A1 Oct. 10, 2002

(30) Foreign Application Priority Data

Apr. 5, 2001 (JP) ..................... P2001-106561

(51) Int. Cl.⁷ ............. G02B 27/28; G02B 5/30
(52) U.S. Cl. ........ 359/499; 359/500; 359/494; 349/118
(58) Field of Search ............. 359/494, 499, 359/500; 349/118, 117, 96; 264/1.31, 1.34, 1.7

(56) References Cited

U.S. PATENT DOCUMENTS 6,179,948 B1 * 1/2001 Merrill et al. ............... 156/229
6,207,260 B1 * 3/2001 Wheatley et al. ............ 428/212

FOREIGN PATENT DOCUMENTS

JP 5-27118 2/1993
JP 10-239518 9/1998

* cited by examiner

*Primary Examiner*—Mark A. Robinson
*Assistant Examiner*—Lee Fineman
(74) *Attorney, Agent, or Firm*—Sughrue Mion, PLLC

(57) ABSTRACT

An optical film having a laminate of three birefringent films A, B and C, the birefringent film A exhibiting dispersion and exhibiting Nz of from 0.4 to 0.6, the birefringent film B exhibiting larger dispersion than that of the birefringent film A and exhibiting smaller Re that that of the birefringent film A and Nz of from 0.4 to 0.6, the birefringent film C exhibiting Re of from 200 to 350 nm and exhibiting Nz of from 0.6 (not inclusively) to 0.9, the birefringent films A and B having slow axes crossing each other perpendicularly when $Re=(nx-ny)d$ and $Nz=(nx-nz)/(nx-ny)$ in which nx, ny and nz are refractive indices of each birefringent film in three-dimensional directions X, Y and Z, and $\underline{d}$ is the thickness of the birefringent film. A polarizer having a laminate of an optical film defined above and an absorptive type polarizing film, the absorptive type polarizing film being laminated on the birefringent film C side of the optical film so that an absorption axis of the absorptive type polarizing film is parallel to a slow axis of the birefringent film C. A liquid-crystal display device or another display device having an optical film or polarizer defined above.

7 Claims, 1 Drawing Sheet

OPTICAL FILM, POLARIZER AND DISPLAY DEVICE

The present application is based on Japanese Patent Application No. 2001-106561, which is incorporated herein by reference.

BACKGROUND OF THE INVENTION

1. Field of the Invention

The present invention relates to an optical film in which axial displacement of the laminate hardly occurs in spite of the change of a view point so that the optical film can be preferably used for forming a liquid-crystal display device good in display quality, a circularly polarizer or an anti-reflection plate.

2. Description of the Related Art

If a phase retarder to be disposed between a polarizer and a liquid-crystal cell in order to improve display quality of a liquid-crystal display device, or a quarter-wave plate used for forming a circularly polarizer or an anti-reflection plate is formed from one birefringent film, birefingence is dispersed in accordance with the wavelength of light on the basis of dispersion peculiar to the material of the retarder or quarter-wave plate. As a result, there is a tendency that the birefringence increases as the wavelength decreases. For this reason, the retardation of the plate varies in accordance with the wavelength of light, so that the state of polarization cannot change evenly. Under such circumstances, there has been a proposal for an optical film having a laminate of two birefringent films different in birefringence dispersion depending on the wavelength of light so that respective slow axes of the two birefringent films cross each other perpendicularly (Unexamined Japanese Patent Publication No. Hei. 5-27118 and Unexamined Japanese Patent Publication No. Hei. 10-239518).

The proposal is aimed at controlling birefringence dispersion depending on the wavelength of light by the lamination of the birefringent films so that the birefringene decreases as the wavelength decreases. That is, the proposal is provided for obtaining a uniform compensating effect in achieving a uniform change of the state of polarization in a wide wavelength range. Although the perpendicularly crossing relation can be kept so as to fulfill the required effect when observed on an optical axis, the perpendicularly crossing relation is corrupted because of the change of the apparent axial angle when observed from an oblique direction at an azimuth displaced from the optical axis. Hence, there is a problem that the state of polarization varies without fulfillment of the required effect. Even in the case where Nz values of the birefringent films are controlled to compensate for axial displacement from the polarizer as disclosed in the aforementioned JP 5-27118 this measure is not effective in compensating for axial displacement of the birefringent film laminate itself.

SUMMARY OF THE INVENTION

An object of the invention is to develop an optical film in which the axial relation between slow axes crossing each other perpendicularly can be kept good in spite of the change of a view point so that the optical film can be used for forming a liquid-crystal display device good in display quality, a quarter-wave plate, etc.

According to the invention, there is provided an optical film having a laminate of three birefringent films A, B and C, the birefringent film A exhibiting refractive index dispersion in accordance with the wavelength of light and exhibiting Nz of from 0.4 to 0.6, the birefringent film B exhibiting larger refractive index dispersion in accordance with the wavelength of light than that of the birefringent film A and exhibiting smaller Re that that of the birefringent film A and NZ of from 0.4 to 0.6, the birefringent film C exhibiting Re of from 200 to 350 nm and exhibiting Nz of from 0.6 (not inclusively) to 0.9, the birefringent films A and B having slow axes crossing each other perpendicularly when Re=(nx−ny)d and Nz=(nx−nz)/(nx−ny) in which nz is a refractive index of each birefringent film in a direction of a Z axis expressing a direction of the thickness of the birefringent film, nx is a refractive index of the birefringent film in a direction of an X axis expressing a direction of the maximum refractive index of the birefringent film in a plane perpendicular to the Z axis, ny is a refractive index of the birefringent film in a direction of a Y axis expressing a direction perpendicular both to the X axis and to the Z axis, and $\underline{d}$ is the thickness of the birefringent film. There is also provided a liquid-crystal display device having a liquid-crystal cell, and at least one optical film defined above and disposed on at least one surface of the liquid-crystal cell.

According to the invention, there is further provided a polarizer having a laminate of an optical film defined above and an absorptive type polarizing film, the absorptive type polarizing film being laminated on the birefringent film C side of the optical film so that an absorption axis of the absorptive type polarizing film is parallel to a slow axis of the birefringent film C in the condition that the birefringent film C is located in an outer side of the optical film. There is further provided a liquid-crystal display device having a liquid-crystal cell, and at least one polarizer defined above and disposed on at least one surface of the liquid-crystal cell so that the absorptive type polarizing film of the polarizer is located in an outer side. There is further provided a display device having a polarizer defined above, wherein: an in-plane retardation of the laminate of the birefringent films A and B is in a range of from 80 to 400 nm; and the polarizer is disposed on an outermost surface so that the absorptive type polarizing film of the polarizer is located in an outer side.

According to the invention, in addition to the characteristic that the retardation due to birefringence hardly changes on an optical axis can be retained by the combination of the birefringent films A and B and the arrangement relation between the birefringent films A and B, the perpendicularly crossing relation between optical axes can be retained accurately even in the case where the view point is changed within 360 degrees. It is accordingly possible to obtain an optical film which can fulfill a homogeneous compensating effect even in the case where the optical film is observed at any azimuth and in which the birefringent film C can compensate for axial displacement from the polarizing film in an obliquely viewing direction to thereby prevent the optical axis of the optical film from changing. As a result, the optical film can be used for forming a liquid-crystal display device good in display quality. Moreover, such an optical film functioning as a quarter-wave plate can be used in combination with an absorptive type polarizing film for obtaining a circularly polarizer or an anti-reflection plate in which the uniform change of the state of polarization in a wide wavelength range can be achieved to obtain a uniform compensating effect even in the case where observation is made at any azimuth. The circularly polarizer or the anti-reflection plate can be used for obtaining various kinds of display devices good in display quality.

Features and advantages of the invention will be evident from the following detailed description of the preferred embodiments described in conjunction with the attached drawings.

DETAILED DESCRIPTION OF THE PREFERRED EMBODIMENTS

Figure 1:
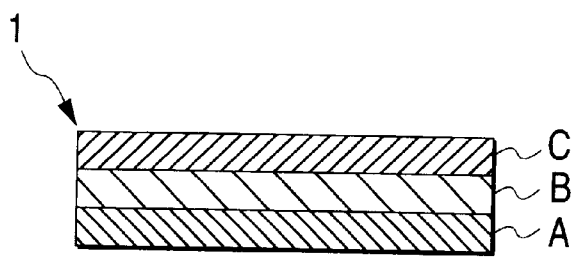
FIG. 1 shows a sectional view of an example of an optical film according to the invention.

As shown in FIG. 1, the optical film 1 according to the invention has a laminate of three birefringent films A, B and C, the birefringent film A exhibiting refractive index dispersion in accordance with the wavelength of light and exhibiting Nz of from 0.4 to 0.6, the birefringent film B exhibiting larger refractive index dispersion in accordance with the wavelength of light than that of the birefringent film A and exhibiting smaller Re that that of the birefringent film A and Nz of from 0.4 to 0.6, the birefringent film C exhibiting Re of from 200 to 350 nm and exhibiting Nz of from 0.6 (not inclusively) to 0.9, the birefringent films A and B having slow axes crossing each other perpendicularly when Re=(nx−ny)d and Nz=(nx−nz)/(nx−ny) in which nz is a refractive index of each birefringent film in a direction of a Z axis expressing a direction of the thickness of the birefringent film, nx is a refractive index of the birefringent film in a direction of an X axis expressing a direction of the maximum refractive index of the birefringent film in a plane perpendicular to the Z axis, ny is a refractive index of the birefringent film in a direction of a Y axis expressing a direction perpendicular both to the X axis and to the Z axis, and $\underline{d}$ is the thickness of the birefringent film. Hereupon, "refractive index dispersion in accordance with the wavelength of light" is equivalent to a slope of the graph showing a relationship between the wavelength of the light and the refractive index.

The optical film can be formed by lamination of the birefringent films A, B and C. In this case, a birefringent film exhibiting refractive index dispersion in accordance with the wavelength of light and exhibiting Nz of from 0.4 to 0.6 is preferably used as the birefringent film A (first birefringent film). A birefringent film exhibiting larger refractive index dispersion in accordance with the wavelength of light than that of the birefringent film A and exhibiting smaller Re than that of the birefringent film A and Nz of from 0.4 to 0.6 is preferably used as the birefringent film B (second birefringent film). A birefringent film exhibiting Re of from 200 to 350 nm and Nz of from 0.6 (not inclusively) to 0.9 is preferably used as the birefringent film C (third birefringent film).

Incidentally, in the description, Nz and Re are defined as Nz=(nx−nz)/(nx−ny) and Re=(nx−ny)d in which nz is a refractive index of each birefringent film in a direction of a Z axis expressing a direction of the thickness of the birefringent film, nx is a refractive index of the birefringent film in a direction of an X axis expressing a direction of the maximum refractive index of the birefringent film in a plane perpendicular to the Z axis, ny is a refractive index of the birefringent film in a direction of a Y axis expressing a direction perpendicular both to the X axis and to the Z axis, and $\underline{d}$ is the thickness of the birefringent film. This definition applies hereunder.

Accordingly, the birefringent films A, B and C can be used in such combination that the birefringent films A, B and C are different from one another in at least one of characteristics such as refractive index dispersion dependent on the wavelength of light, Re and Nz. In this case, birefringent films different in at least one of constituent material, refractive index dispersion dependent on the wavelength of light, birefringence dispersion dependent on the wavelength of light, Re and Nz can be regarded as different kinds of birefringent films. Hence, the birefringent films A, B and C may be made from one material. Each of the birefringent films A, B and C maybe of a single-layer structure or of a multilayer structure constituted by a laminate of a plurality of retardation films in order to control these characteristics. In this case, the retardation films to be laminated on one another may be constituted by one kind of material or may be constituted by different kinds of materials respectively. The respective birefringent films, especially the birefringent films A and B, may be laminated by a method in which at least two retardation films constituting one birefringent film A (or B) and, for example, another birefringent film B (or A) or at least two retardation films constituting the other birefringent film B (or A) are disposed alternately. That is, at least two retardation films constituting one birefringent film need not be laminated adjacently.

A suitable film can be used as each of films constituting the birefringent film without any particular limitation. Examples of the suitable film include: a film of a polymer such as polycarbonate, polypropylene, polyester, polyvinyl alcohol, polymethyl methacrylate, polyether-sulfone, polyallylate or polyimide; and a film composed of an isotropic base material coated with an inorganic or liquid-crystal material. Especially, a film excellent in transparency (light transmittance) is preferred. The birefringent film made of a polymer film may be obtained as a drawn film subjected to a suitable drawing process such as a uniaxial process or a biaxial process.

The birefringent films A and B satisfying the condition of dispersion dependent on the wavelength of light are laminated on each other so that slow axes of the birefringent films A and B cross each other perpendicularly. As a result, it is possible to obtain an optical film in which optical axes of the birefringent films do not change from predetermined directions in spite of observation at any azimuth, that is, the optical axes of the birefringent films always cross each other perpendicularly regardless of the direction of observation, so that there is no axial change from a predetermined angle. In this case, when the birefringent film B having smaller Re than that of the birefringent film A is used, an optical film exhibiting suppressed refractive index dispersion in accordance with the wavelength of light can be produced.

Each of the birefringent films A and B preferably used from the point of view of achieving the characteristic highly accurately satisfies Nz of from 0.45 to 0.55. The in-plane retardation based on the birefringent films A and B (Re based on both A and B) is not particularly limited, but is, generally, preferably in a range of from 80 to 400 nm, more preferably in a range of from 100 to 350 nm, further preferably in a range of from 120 to 300 nm, from the point of view of the characteristic. Incidentally, the perpendicularly crossing relation between the slow axes of the birefringent films A and B is preferably set so that the slow axes are as perpendicular to each other as possible though axial displacement caused by operating error can be allowed. When there is variation in the direction of the slow axis of each film, the slow axis can be determined on the basis of the averaged direction of the slow axis.

On the other hand, from the point of view of high-degree compensation, a birefringent film having Re of from 220 to 330 nm, especially from 250 to 300 nm and Nz of from 0.7 to 0.8 can be preferably used as the birefringent film C used to compensate for axial displacement from the polarizing film in an obliquely viewing direction to thereby obtain an optical film free from the change of optical axes in use as a polarizer. The sequence of lamination of the birefringent films A, B and C is not particularly limited. From the point of view of stabilizing the compensating effect, it is preferable that the optical film has a laminate structure in which the birefringent film C is located in the outer side. In this case, the birefringent film C may be disposed on the birefringent film A side or on the birefringent film B side.

The value of Nz can be controlled by a method of changing the refractive index of the film in the direction of the thickness. An example of the method is a method having the steps of: curing a film of a polymer such as polycarbonate exhibiting positive birefringence on the basis of appearance of a slow axis in a direction of orientation of molecules while adjusting the state of orientation by applying an electric field to the polymer in a direction of the thickness of the film; and drawing the film. The value of Re can be controlled by a method of, for example, changing the constituent material, the film-drawing condition or the film thickness.

The birefringent films A, B and C in the optical film may be simply stacked on one another. Preferably, the birefringent films A, B and C may be laminated so as to be adhesively fixed onto one another in order to prevent displacement of the optical axis. The method of lamination of the birefringent films A, B and C is not particularly limited. For example, a suitable method such as a bonding method using an adhesive agent or a tackifier can be used. The kind of the adhesive agent is not particularly limited too. From the point of view of preventing the change of optical characteristic of each birefringent film, an adhesive agent not requiring any high-temperature process for curing and drying is preferred and an adhesive agent not requiring any long-time curing and long-time drying is preferred.

The method preferably used in the case where the birefringent films A and B are laminated so that their slow axes cross each other perpendicularly is a method using lyotropic liquid crystal and particularly a method using lyotropic liquid crystal for forming the birefringent film B. Incidentally, for laminating the birefringent films A and B constituted by drawn films respectively while making their slow axes cross each other perpendicularly, it is necessary to cut and align the drawn films accurately to thereby result in troublesome work due to a batch process. On the other hand, lyotropic liquid crystal exhibiting alignment characteristic through shear force has such characteristic that its slow axis appears in a direction perpendicular to the direction of application of the lyotropic liquid crystal. When, for example, lyotropic liquid crystal is applied along the drawing axis of the birefringent film A, slow axes of the birefringent films A and B crossing each other perpendicularly can be formed easily. Hence, the use of lyotropic liquid crystal can simplify the laminating work and is excellent in production efficiency. Further, a coating method is also advantageous in reduction of the thickness because it is unnecessary to provide any adhesive agent separately when the coating method is used for adhesive lamination. In addition, a suitable lyotropic liquid crystal material exhibiting the alignment characteristic through shear force can be used for the lyotropic liquid crystal.

Figure 2:
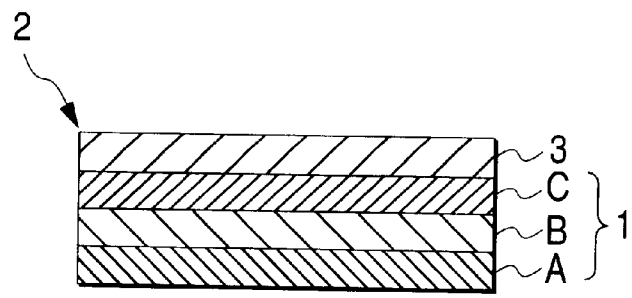
FIG. 2 shows a sectional view of an example of a polarizer according to the invention.

The optical film can be used for various purposes in accordance with its retardation characteristic in the same manner as the related-art phase retarder or wave plate. Examples of the purposes include compensation for the retardation due to birefringence of liquid crystal, formation of a circularly polarizer or an anti-reflection plate, and rotation of the azimuth (plane of vibration) of linearly polarized light. In this case, the optical film 1 may be laminated on an absorptive type polarizing film 3 to put a resulting polarizer 2 into practical use as shown in FIG. 2. The polarizer can reduce the change of polarizing characteristic due to the viewing angle and the wavelength of light, so that the polarizer can be preferably used for forming a liquid-crystal display device exhibiting good display quality at a wide viewing angle in all azimuths. In addition, the polarizer can be preferably used as an anti-reflection plate little in change of characteristic in accordance with the wavelength of light.

The polarizer 2 can be obtained as a laminate of the optical film 1 and an absorptive type polarizing film 3 disposed on the birefringent film C side of the optical film 1 so that the absorption axis of the absorptive type polarizing film 3 is parallel to the slow axis of the birefringent film C in the condition that the birefringent film C is located in the outer side of the optical film 1. A suitable material can be used as the absorptive type polarizing film without any particular limitation. Examples of the material generally used include: a film formed by adsorbing iodine or a dichromatic substance such as dichromatic dye onto a hydrophilic polymer film such as a polyvinyl alcohol film and drawing the hydrophilic polymer film; and a polyene-oriented film obtained by processing a film of a polymer such as polyvinyl chloride. The absorptive type polarizing film maybe provided with one transparent protective layer made of a triacetyl cellulose film or the like and disposed on one or each of opposite surfaces of the absorptive type polarizing film.

Any suitable method can be applied to the lamination of the optical film and the absorptive type polarizing film without particular limitation. Various kinds of methods using adhesive agents as listed above in the description for the lamination of the birefringent films A, B and C can be applied to the lamination of the optical film and the absorptive type polarizing film. Incidentally, the optical film may be provided so that it serves also as a transparent protective layer in the absorptive type polarizing film. A resin coating layer, an anti-reflection layer, an anti-glare layer or the like may be provided on one or each of opposite surfaces of the polarizer for the purpose of protection such as water resistance as occasion demands. The parallel relation between the slow axis of the birefringent film C and the absorption axis of the polarizing film is preferably set so that these axes are as parallel to each other as possible though axial displacement caused by operating error can be allowed. When there is variation in the direction of the slow axis or the absorption axis, the slow axis or the absorption axis can be determined on the basis of the averaged direction thereof.

The optical film or the polarizer made of a laminate of the optical film and an absorptive type polarizing film can be used for various kinds of purposes in accordance with the retardation characteristic of the optical film. For example, the optical film or the polarizer may be used for forming a liquid-crystal display device. Incidentally, in a display device using reflective TN liquid crystal, there is the case where circularly polarized light may be made incident on the liquid-crystal cell for the purpose of improving display quality. In this case, the polarizer according to the invention can be disposed as a circularly polarizer to achieve good display quality free from coloring in a black display state. In addition, the polarizer can be used to compensate for the retardation due to the liquid-crystal cell to thereby improve display quality such as widening of the viewing angle.

The optical film preferably used for forming a circularly polarizer is an optical film exhibiting an in-plane retardation of a laminate of the birefringent films A and B ranging from 90 to 350 nm, especially from 100 to 300 nm. The optical film preferably used from the point of view of controlling the state of polarization of light transmitted through the polarizer is an optical film in which the optical axis of the laminate of the birefringent films A and B crosses the slow axis of the birefringent film C at a crossing angle ranging from 10 to 80 degrees, especially from 30 to 60 degrees, further especially from 40 to 50 degrees.

Figure 3:
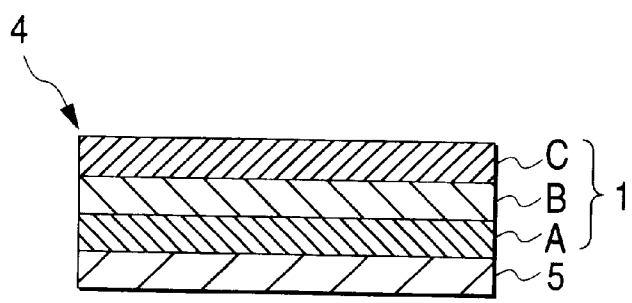
FIG. 3 shows a sectional view of an example of a liquid-crystal display device according to the invention.
Figure 4:
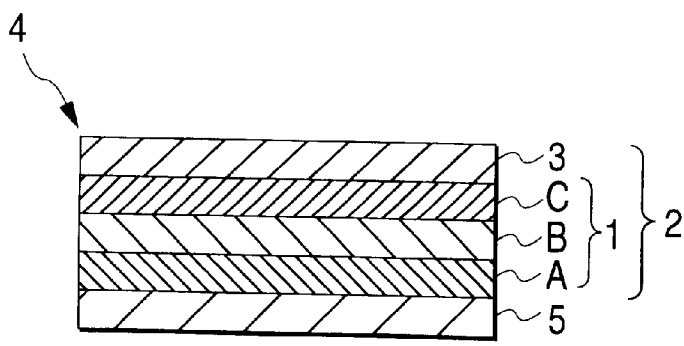
FIG. 4 shows a sectional view of another example of a liquid-crystal display device according to the invention.

A liquid-crystal display device 4 can be formed by arrangement of the optical film 1 or polarizer 2 on one or each of opposite surfaces of a liquid-crystal cell 5 as shown in FIGS. 3 and 4. In this case, the optical film 1 is preferably disposed between the absorptive type polarizing film 3 and the liquid-crystal cell 5 in order to obtain a liquid-crystal display device 4 good in display quality and wide in viewing angle. Therefore, the polarizer is preferably disposed so that the absorptive type polarizing film of the polarizer is located in the outer side. The liquid-crystal cell used is optional. For example, a suitable liquid-crystal cell such as a TN type liquid-crystal cell, an STN type liquid-crystal cell or a VA type liquid-crystal cell may be used. Any suitable type liquid-crystal display device such as a transmissive liquid-crystal device, a reflective liquid-crystal device or an external light-illumination double type liquid-crystal device may be used as the liquid-crystal device. When the liquid-crystal display device is formed, the optical film or polarizer may be laminated on any suitable optical component such as a phase retarder or a light-diffusing plate which can be used for forming the liquid-crystal display device.

The polarizer provided as a circularly polarizer can be used as an anti-reflection plate. In this case, the polarizer can exhibit anti-reflection characteristic in a wide wavelength range to thereby obtain good characteristic free from coloring due to reflected light. The anti-reflection characteristic can be fulfilled when the polarizer is disposed on the outermost surface so that the absorptive type polarizing film of the polarizer is located in the outer side. Hence, various kinds of display devices can be formed. The display device is not particularly limited. For example, various kinds of devices in accordance with the related-art display device provided with an anti-reflection film can be formed.

EXAMPLE 1

A birefringent film A1 made of a drawn film of polynorbornene, exhibiting refractive index dispersion in accordance with the wavelength of light and having Re of 300 nm and Nz of 0.5 and a birefringent film B1 made of a drawn film of polycarbonate, exhibiting larger refractive index dispersion in accordance with the wavelength of light than the refractive index dispersion of the birefringent film A1 and having Re of 160 nm and Nz of 0.5 were adhesively laminated on each other through a tackifier so that respective slow axes of the two birefringent films A1 and B1 crossed each other at 90 degrees. Thus, a laminate exhibiting an in-plane retardation of 140 nm was obtained. A birefringent film C1 made of a drawn film of polycarbonate, exhibiting refractive index dispersion in accordance with the wavelength of light and having Re of 260 nm and Nz of 0.75 was adhesively laminated on the birefringent film B1 of the laminate through a tackifier so that a slow axis of the birefringent film C1 crossed the slow axis of the laminate at 45 degrees. Thus, an optical film was obtained.

Then, an absorptive type polarizing film constituted by a uniaxially drawn film of iodine-adsorbed polyvinyl alcohol and a transparent protective layer of a triacetyl cellulose film provided on one surface of the uniaxially drawn film was adhesively laminated on the optical film through a tackifier while a surface of the absorptive type polarizing film opposite to the transparent protective layer was disposed on the birefringent film C1 so that the absorption axis of the absorptive type polarizing film was parallel to the slow axis of the birefringent film C1. Thus, a circularly polarizer was obtained.

Comparative Example 1

A circularly polarizer was obtained in the same manner as in Example 1 except that a laminate of the birefringent films A1 and B1 was used, that is, a laminate having no birefringent film C was used as the optical film.

Evaluation Test 1

The state of polarization of light transmitted through the absorptive type polarizing film in the circularly polarizer obtained in each of Example 1 and Comparative Example 1 was measured in a visible light range, so that Stokes parameters standardized on the basis of an S0 component regarded as 1 were obtained from the obtained values. As a result, it was found that the absolute value of an S3 component in Example 1 was in a range of from 0.94 to 1.0 either in a normal direction and in an obliquely viewing direction (in a direction of 70 degrees from the normal direction and at an azimuth of 45 degrees from the absorption axis of the absorptive type polarizing film) In Comparative Example 1, the absolute value of the S3 component was in a range of from 0.94 to 1.0 in the normal direction but in a range of from 0.88 to 0.97 in the obliquely viewing direction. That is, in Comparative Example 1, the quantity of the elliptically polarized light component was large.

EXAMPLE 2

A birefringent film A2 made of a drawn film of polynorbornene, exhibiting refractive index dispersion in accordance with the wavelength of light and having Re of 400 nm and Nz of 0.5, and a birefringent film B2 made of a drawn film of polycarbonate, exhibiting larger refractive index dispersion in accordance with the wavelength of light than the refractive index dispersion of the birefringent film A2 and having Re of 125 nm and Nz of 0.5 were adhesively laminated on each other through a tackifier so that respective slow axes of the two birefringent films A2 and B2 crossed each other at 90 degrees. Thus, a laminate exhibiting an in-plane retardation of 275 nm was obtained. A birefringent film C1 was adhesively laminated on the birefringent film B2 of the laminate in the same manner as in Example 1. Thus, an optical film function in gas a polarized light rotating film was obtained.

Comparative Example 2

An optical film functioning as a polarized light rotating film was obtained in the same manner as in Example 2 except that a laminate of the birefringent films A2 and B2 was used, that is, a laminate having no birefringent film C1 was used as the optical film.

Evaluation Test 2

The state of polarization of light emerging from the optical film obtained in each of Example 2 and Comparative Example 2 was observed with respect to linearly polarized light to be rotated in the condition that the optical film in Example 2 was disposed so that linearly polarized light was parallel to the slow axis of the birefringent film C1 whereas the optical film in Comparative Example 2 was disposed so that the optical axis of the optical film crossed the direction of polarization of light at 45 degrees. As a result, in Example 2, linearly polarized light was obtained so that the plane of vibration was rotated by about 90 degrees in spite of observation in any direction. In Comparative Example 2, however, the rotation angle of the plane of vibration varied in accordance with the direction of observation, so that a displacement of about 15 degrees from the target rotation angle of the plane of vibration occurred in an obliquely viewing direction of 70 degrees from the normal direction and at an azimuth of 45 degrees from the incident linearly polarized light.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. An optical film comprising a laminate of first, second and third birefringent films, said first birefringent film exhibiting refractive index dispersion in accordance with a wavelength of light and exhibiting Nz of from 0.4 to 0.6, said second birefringent film exhibiting larger refractive index dispersion in accordance with the wavelength of light than that of said first birefringent film and exhibiting smaller Re than that of said first birefringent film and Nz of from 0.4 to 0.6, said third birefringent film exhibiting Re of from 200 to 350 nm and exhibiting Nz of from 0.6, not inclusively, to 0.9, said first and second birefringent films having slow axes crossing each other perpendicularly when Re=(nx−ny) d and Nz=(nx−nz)/(nx−ny) in which nz is a refractive index of each birefringent film in a direction of a Z axis expressing a direction of a thickness of said birefringent film, nx is a refractive index of said birefringent film in a direction of an X axis expressing a direction of a maximum refractive index of said birefringent film in a plane perpendicular to said Z axis, ny is a refractive index of said birefringent film in a direction of a Y axis expressing a direction perpendicular both to said X axis and to said Z axis, and d is the thickness of said birefringent film.

2. A liquid-crystal display device comprising a liquid-crystal cell, and at least one optical film according to claim 1 and disposed on at least one surface of said liquid-crystal cell.

3. A polarizer comprising a laminate of an optical film according to claim 1 and an absorptive type polarizing film, said absorptive type polarizing film being laminated on said third birefringent film side of said optical film so that an absorption axis of said absorptive type polarizing film is parallel to a slow axis of said third birefringent film in the condition that said third birefringent film is located in an outer side of said optical film.

4. A polarizer according to claim 3, wherein an optical axis of a laminate of said first and second birefringent films crosses said slow axis of said third birefringent film at a crossing angle in a range of from 10 to 80 degrees.

5. A polarizer according to claim 4, wherein an in-plane retardation of said laminate of said first and second birefringent films is in a range of from 80 to 400 nm.

6. A display device comprising a polarizer according to claim 5 and disposed on an outermost surface so that an absorptive type polarizing film of said polarizer is located in an outer side.

7. A liquid-crystal display device comprising a liquid-crystal cell, and at least one polarizer according to claim 3 and disposed on at least one surface of said liquid-crystal cell so that an absorptive type polarizing film of said polarizer is located in an outer side.

* * * * *